(12) United States Patent
Aoshika et al.

(10) Patent No.: US 12,715,268 B2
(45) Date of Patent: Aug. 25, 2026

(54) DRAINAGE STRUCTURE FOR VEHICLE AIR-CONDITIONING DEVICE

(71) Applicant: Highly Marelli Japan Corporation, Tokyo (JP)

(72) Inventors: Makoto Aoshika, Tokyo (JP); Takahito Ishikawa, Tokyo (JP); Hiromichi Yanashima, Tokyo (JP); Ryuuji Tsukuda, Tokyo (JP)

(73) Assignee: HIGHLY MARELLI JAPAN CORPORATION, Tokyo (JP)

( * ) Notice: Subject to any disclaimer, the term of this patent is extended or adjusted under 35 U.S.C. 154(b) by 120 days.

(21) Appl. No.: 18/711,943

(22) PCT Filed: Nov. 2, 2022

(86) PCT No.: PCT/JP2022/041046

§ 371 (c)(1),
(2) Date: May 21, 2024

(87) PCT Pub. No.: WO2023/095585

PCT Pub. Date: Jun. 1, 2023

(65) Prior Publication Data

US 2025/0018772 A1 Jan. 16, 2025

(30) Foreign Application Priority Data

Nov. 24, 2021 (JP) ................................ 2021-190302

(51) Int. Cl.
*B60H 1/32* (2006.01)
*B60H 1/00* (2006.01)

(52) U.S. Cl.
CPC ..... *B60H 1/3233* (2013.01); *B60H 2001/006* (2013.01)

(58) Field of Classification Search
CPC ............. B60H 1/3233; B60H 2001/006; F24F 2013/227; F24F 13/222
See application file for complete search history.

(56) References Cited

U.S. PATENT DOCUMENTS

2020/0408440 A1* 12/2020 Sugiura .................... B60H 1/32
2021/0206231 A1 7/2021 Tsukuda et al.

FOREIGN PATENT DOCUMENTS

CN 102967041 A * 3/2013 ........... B60H 1/3233
CN 107199848 A * 9/2017 ......... B60H 1/00507
(Continued)

OTHER PUBLICATIONS

KR-20150021259-A Translation (Year: 2015).*
(Continued)

*Primary Examiner* — David J Teitelbaum
(74) *Attorney, Agent, or Firm* — Foley & Lardner LLP

(57) ABSTRACT

A drainage structure for an air-conditioning device of a vehicle, the vehicle includes: a partition wall configured to partition between an interior and an exterior of a vehicle cabin for a passenger; an evaporator arranged at an outside of the partition wall for the vehicle cabin, the evaporator being configured to cool the air to be supplied to the interior of the vehicle cabin through the heat exchange with the refrigerant; and a cover attached to the partition wall from the front side of the vehicle cabin, the cover being configured to accommodate the evaporator. The drainage structure includes a drain pipe for draining the condensed water generated by the evaporator to the outside by extending in the attachment direction of the cover by being inserted into the cover, wherein the drain pipe has the slit formed so as to be inclined upwards along the extending direction from the lower end portion.

9 Claims, 5 Drawing Sheets

(56) References Cited

FOREIGN PATENT DOCUMENTS

| | | | | | |
|---|---|---|---|---|---|
| CN | 210861525 | U | | 6/2020 | |
| JP | H02-071076 | A | | 3/1990 | |
| JP | H10-324146 | A | | 12/1998 | |
| JP | H11-107949 | A | | 4/1999 | |
| JP | H11-132639 | A | | 5/1999 | |
| JP | 2005170303 | A | * | 6/2005 | ......... B60H 1/00028 |
| JP | 2019-202755 | A | | 11/2019 | |
| KR | 19980030821 | U | * | 8/1998 | ........... B60H 1/3233 |
| KR | 20150021259 | A | * | 3/2015 | ......... B60H 1/00571 |
| KR | 20220001579 | A | * | 1/2022 | ......... B60H 1/00507 |
| WO | WO-2008144951 | A1 | * | 12/2008 | ........... F16K 15/147 |

OTHER PUBLICATIONS

KR-19980030821-U Translation (Year: 1998).*
JP-2005170303-A (Year: 2005).*
CN-102967041-A Translation (Year: 2013).*
KR-20220001579-A Translation (Year: 2022).*
WO-2008144951-A1 Translation (Year: 2008).*
CN-107199848-A Translation (Year: 2017).*

* cited by examiner

DRAINAGE STRUCTURE FOR VEHICLE AIR-CONDITIONING DEVICE

TECHNICAL FIELD

The present invention relates to a drainage structure for a vehicle air-conditioning device.

BACKGROUND ART

JP2019-202755A discloses a vehicle air-conditioning device in which, in order to enlarge a space in a vehicle cabin, some components of the vehicle air-conditioning device, such as an air blower, an evaporator, and so forth, are arranged in an engine compartment that is partitioned from the vehicle cabin by a partition wall. In such a vehicle air-conditioning device, a cover for accommodating the components is provided to prevent outside noise from entering the vehicle cabin.

SUMMARY OF INVENTION

When the evaporator is to be installed outside the partition wall for the vehicle cabin, such as in the engine compartment, etc., it is required to provide an opening in the cover to drain condensed water generated in the evaporator to the outside; however, if the opening is provided, there is a risk in that the outside noise enters the vehicle cabin through the opening.

An object of the present invention is to suppress entry of outside noise to a vehicle cabin even when an evaporator is provided outside a partition wall for the vehicle cabin and when an opening for draining condensed water to the outside is provided in a cover.

According to an aspect of the present invention, a drainage structure for a vehicle air-conditioning device of a vehicle, the vehicle comprising: a partition wall configured to partition between an interior and an exterior of a vehicle cabin for a passenger; an evaporator arranged at outside of the partition wall for the vehicle cabin, the evaporator being configured to cool air to be supplied to the interior of the vehicle cabin through heat exchange with a refrigerant; and a cover attached to the partition wall from a front side of the vehicle cabin, the cover being configured to accommodate the evaporator, the drainage structure comprises a drain pipe for draining condensed water generated by the evaporator to outside by extending in an attachment direction of the cover by being inserted into the cover, wherein the drain pipe has a slit formed so as to be inclined upwards along an extending direction from a lower end portion.

With the aspect described above, the drain pipe for draining the condensed water to the outside by extending in the attachment direction of the cover by being inserted into the cover is provided, and the drain pipe has the slit that is diagonally inclined upwards along the extending direction from the lower end portion. Therefore, although the drain pipe needs to be inserted into the cover when the cover is to be attached to the partition wall, it suffices that the cover is formed with an opening having the size that allows the insertion of the drain pipe. Therefore, even in a case in which the evaporator is provided at the outside of the partition wall for the vehicle cabin and in which the opening for draining the condensed water to the outside is provided in the cover, it is possible to suppress entry of the outside noise to the vehicle cabin.

DESCRIPTION OF EMBODIMENTS

In the following, a vehicle 1, in which a drainage structure (hereinafter, simply referred to as "drainage structure") 100 for a vehicle air-conditioning device according to an embodiment of the present invention is applied, will be described with reference to the drawings.

Figure 1:
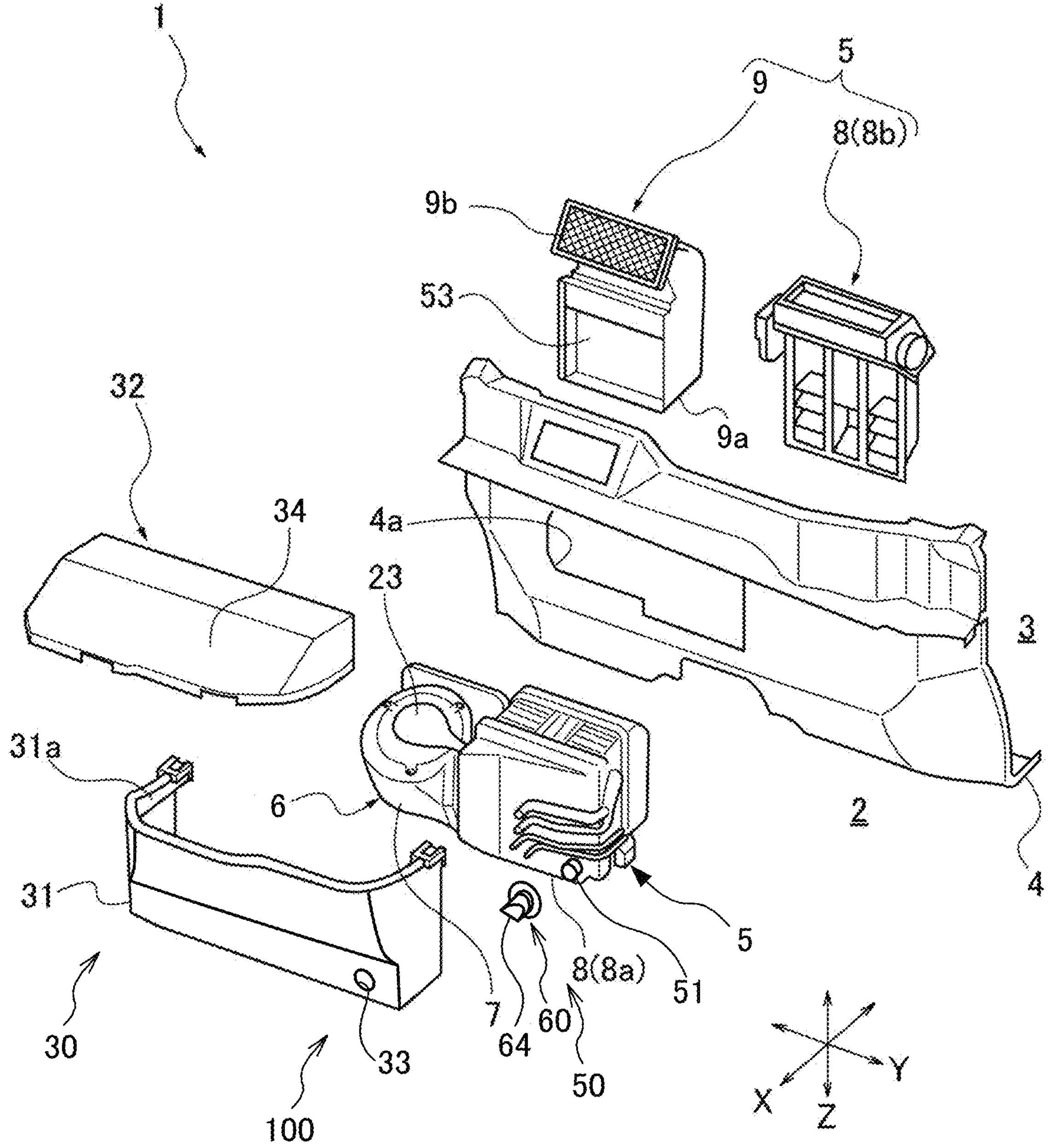
FIG. 1 is an exploded perspective view of a relevant portion a vehicle to which a drainage structure according to an embodiment of the present invention is applied.
Figure 2:
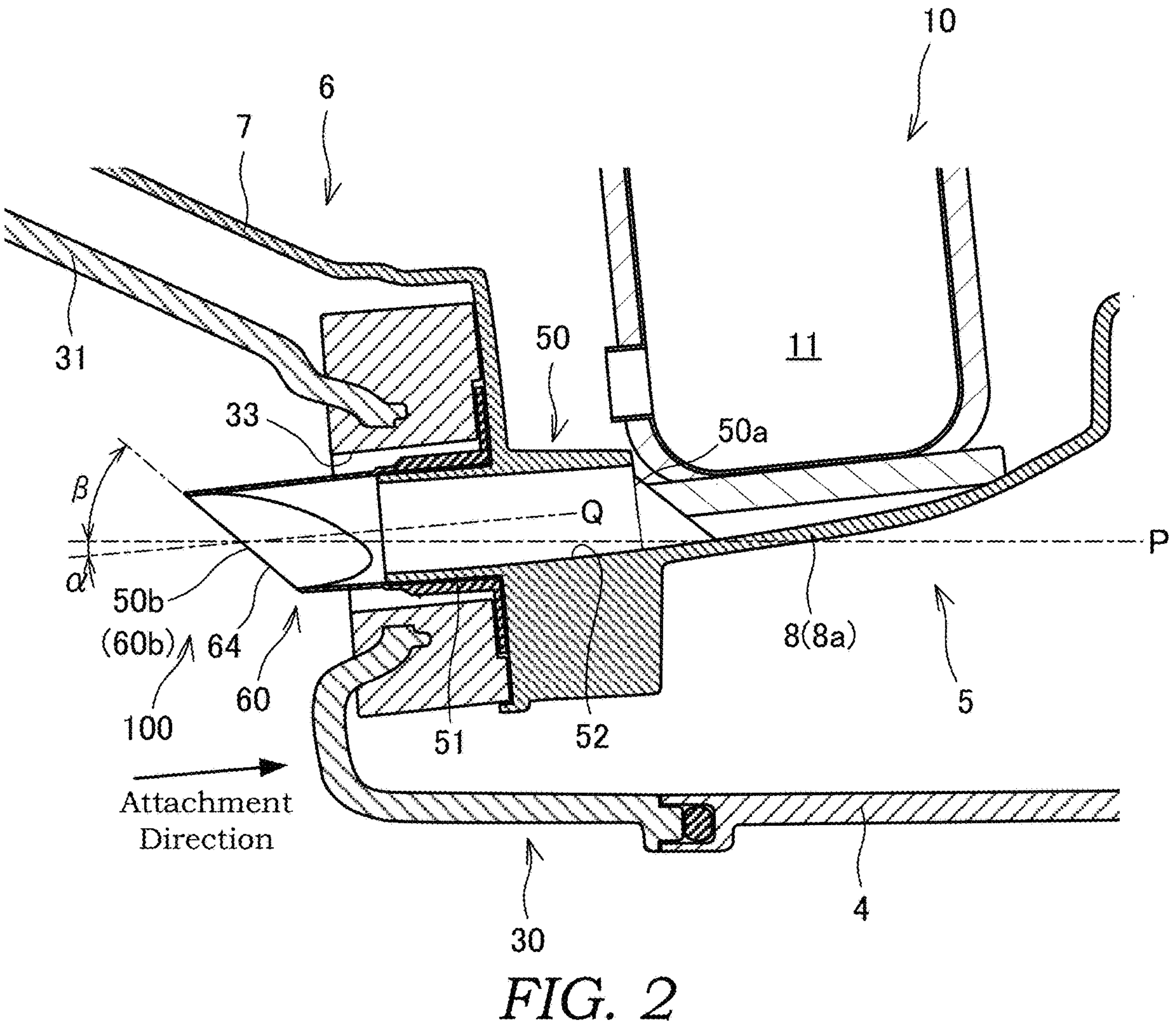
FIG. 2 is a sectional view of a vicinity of the drainage structure in a vehicle air-conditioning device.

An overall configuration of the vehicle 1 will be described with reference to FIGS. 1 and 2. FIG. 1 is an exploded perspective view of a relevant portion of the vehicle 1, to which the drainage structure 100 is applied. FIG. 2 is a sectional view of a vicinity of the drainage structure 100 in the vehicle 1. In FIG. 1, the X axis extends in the vehicle length direction (the front-rear direction), the Y axis extends in the vehicle width direction (the left-right direction), and the Z axis extends in the vehicle height direction (the up-down direction). The X axis, the Y axis, and the Z axis are orthogonal with each other.

As shown in FIG. 1, the vehicle 1 has an engine compartment (a motor compartment in a case of an electric car) 2 serving as a driving source compartment, a vehicle cabin 3, a partition wall 4, a vehicle air-conditioning device (hereinafter, simply referred to as "an air-conditioning device") 5, and a cover 30.

The engine compartment 2 is provided on the front part of the vehicle 1. In the engine compartment 2, an engine (not shown), an electric motor (not shown), and so forth, serving as a driving source for driving driving wheels (not shown) of the vehicle 1, are accommodated.

The vehicle cabin 3 is provided behind the engine compartment 2. In other words, the engine compartment 2 and the vehicle cabin 3 are provided so as to be arranged side by side in the front-rear direction of the vehicle 1. A passenger rides inside the vehicle cabin 3.

The partition wall 4 partitions between the engine compartment 2 and the vehicle cabin 3. In other words, the partition wall 4 partitions between an interior and an exterior of the vehicle cabin 3. The partition wall 4 prevents the noise inside the engine compartment 2 and the noise outside the vehicle 1 from entering the vehicle cabin 3. A through-hole portion **4*a* is provided in the partition wall 4**.

The air-conditioning device 5 has an HVAC (Heating Ventilation and Air Conditioning) unit 6, a refrigeration cycle circuit 10 (see FIG. 2), and the drainage structure 100.

Air used for air conditioning flows through the HVAC unit 6. The HVAC unit 6 has a case 7, an air-conditioning device main body 8, an inside-outside-air switching device 9, and an air blower 23.

In a general air-conditioning device, all components of the HVAC unit 6 are arranged in the front part in the vehicle cabin 3 (a rear side of the partition wall 4), and they are hidden so as not to be visible from the passenger inside the vehicle cabin 3 by being covered from above by an instrument panel (not shown).

In contrast, in the air-conditioning device 5, the HVAC unit 6 is divided and respectively arranged in the engine compartment 2 and the vehicle cabin 3, and they are connected via the through-hole portion 4*a* in the partition wall 4. Specifically, in the air-conditioning device 5, the air blower 23 and an evaporator 11, which will be described later, (see FIG. 2) of the refrigeration cycle circuit 10 are provided in the engine compartment 2, and other components such as the inside-outside-air switching device 9, etc. are provided in the vehicle cabin 3. As described above, by arranging some components of the air-conditioning device 5 in the engine compartment 2, the space inside the vehicle cabin 3 is increased.

The case 7 accommodates the air blower 23 and the evaporator 11 (see FIG. 2). The case 7 defines an internal space through which the air used for the air conditioning flows.

The air blower 23 is rotationally driven by an electric motor (not shown). The air blower 23 takes in the air inside the vehicle cabin 3 and the outside air into the HVAC unit 6.

The air-conditioning device main body 8 has a front-side portion 8*a* and a rear-side portion 8*b*. The front-side portion 8*a* is arranged in the engine compartment 2. The front-side portion 8*a* accommodates the evaporator 11. The rear-side portion 8*b* is accommodated in the vehicle cabin 3. The rear-side portion 8*b* is provided with an outlet switching device (not shown) that switches which outlets in the vehicle cabin 3 the air is blown out from.

The inside-outside-air switching device 9 has an inside-air intake 9*a*, an outside-air intake 9*b*, and a filter 53. The air inside the vehicle cabin 3 is taken in from the inside-air intake 9*a*. The air outside the vehicle 1 (the outside air) is taken in from the outside-air intake 9*b*. The inside-outside-air switching device 9 switches whether the air is taken in from the inside-air intake 9*a* or the outside-air intake 9*b*.

The filter 53 is detachably attached inside the inside-outside-air switching device 9. The filter 53 cleans the air by removing microparticles from the air taken into the HVAC unit 6 by the air blower 23.

The refrigeration cycle circuit 10 has a compressor (not shown), a condenser (not shown), an expansion valve (not shown), and the evaporator 11. In the refrigeration cycle circuit 10, the compressor compresses gaseous phase refrigerant to achieve a high temperature and high pressure, the condenser condenses and liquefies the refrigerant through heat exchange with the outside air, the expansion valve depressurizes and expands the liquid phase refrigerant, and the evaporator 11 evaporates the refrigerant through heat exchange with the air used for the air conditioning.

The evaporator 11 is provided in the HVAC unit 6, and cools and dehumidifies the air to be supplied to the interior of the vehicle cabin 3 through the heat exchange with the refrigerant. Therefore, condensed water, which is formed by condensation of water vapor from the air, is formed on the surface of the evaporator 11. In order to drain the condensed water to the outside, the air-conditioning device 5 is provided with the drainage structure 100.

As shown in FIG. 2, the drainage structure 100 is provided with a drain pipe 50.

The drain pipe 50 extends in the attachment direction of a cover main body 31, which will be described below. Through the drain pipe 50, the condensed water generated in the evaporator 11 is drained to the outside. In the following, the direction opposite to "the attachment direction" of the cover main body 31 will be referred to as the "extending direction", which is the direction in which the drain pipe 50 extends. The drain pipe 50 has an inclined portion 63 that is provided on a tip end so as to be inclined upwards gradually along the extending direction from a lower end portion. The drain pipe 50 has a guide portion 51 and a drainage plug 60.

The guide portion 51 is formed to have a cylinder shape. In an inner circumference of the guide portion 51, a condensed water passage 52, through which the condensed water flows, is formed. The interior and the exterior of the case 7 are communicated in the extending direction through the guide portion 51. The guide portion 51 guides the condensed water generated by the evaporator 11 in the extending direction.

The drainage plug 60 is attached to a tip end of the guide portion 51. A slit 64 is formed in the drainage plug 60.

FIG. 2 shows a horizontal plane P and a center line Q of the drain pipe 50 (the drainage plug 60). The center line Q extends in the same direction as the attachment direction (the extending direction). The drain pipe 50 is provided so as to be inclined by an angle $\alpha$ [deg] serving as a first predetermined angle with respect to the horizontal plane P so that a tip end portion 50*b*, at which the slit 64 is formed, is positioned lower than a base end portion 50*a*, to which the condensed water generated by the evaporator 11 is supplied. The slit 64 is formed so as to be inclined by an angle $\beta$ [deg] serving as a second predetermined angle with respect to the horizontal plane P. For example, the angle $\alpha$ is 5 [deg], and the angle $\beta$ is 40 [deg], for example. In other words, the angle $\beta$ is larger than the angle $\alpha$. By setting the angle $\alpha$ and the angle $\beta$ as described above, it is possible to ensure the drainage of the condensed water while suppressing increase in the size of the drainage plug 60. The specific configuration of the drainage plug 60 will be described below in detail with reference to FIGS. 3 to 7.

As shown in FIG. 1, the cover 30 is provided in the engine compartment 2 by being attached to the partition wall 4. The cover 30 is attached along the attachment direction (see FIG. 2) from the front side to the rear side of the vehicle cabin 3. The cover 30 accommodates the components of the air-conditioning device 5, such as the air blower 23, the evaporator 11, and so forth, that are arranged inside the engine compartment 2. The cover 30 covers the through-hole portion 4*a* formed in the partition wall 4 so as to hide the through-hole portion 4*a* completely. The cover 30 prevents the noise inside the engine compartment 2 and the noise outside the vehicle 1 from entering the vehicle cabin 3 via the through-hole portion 4*a*. The cover 30 has the cover main body 31 and a lid 32.

The cover main body 31 has an upper opening 31*a* and an insertion hole 33 serving as an opening. The upper opening 31*a* opens at an upper part the cover main body 31 in the engine compartment 2. By providing the upper opening 31*a*, it is allowed to access to the air blower 23 from above the cover 30, thereby making maintenance of the air blower 23 easier.

The insertion hole 33 opens in a circular shape in a front surface of the cover main body 31. Through the insertion hole 33, the interior and the exterior of the cover 30 are communicated in the extending direction. The drainage plug 60 of the drain pipe 50 is inserted into the insertion hole 33.

As described above, the drain pipe 50 for draining the condensed water to the outside by extending in the attachment direction of the cover 30 by being inserted into the cover 30 is provided. Therefore, although the drain pipe 50 needs to be inserted into the cover 30 when the cover 30 is attached to the partition wall 4, it suffices that the cover 30 is formed with the insertion hole 33 having the size that allows the insertion of the drain pipe 50. Thus, the insertion hole 33 formed in the cover 30 can be made smaller. Therefore, even in a case in which the evaporator 11 is provided in the engine compartment 2 and in which the insertion hole 33 for draining the condensed water to the outside is provided in the cover 30, it is possible to suppress the entry of the outside noise to the inside of the vehicle cabin 3.

The lid 32 closes the upper opening 31*a* of the cover main body 31 from above. The lid 32 has an inclined portion 34 that slopes downward toward the front side. Although the through-hole portion 4*a* opens in the partition wall 4, in a state in which the lid 32 is attached, the engine compartment 2 is isolated completely from the vehicle cabin 3 by the partition wall 4, the cover main body 31, and the lid 32.

Figure 3:
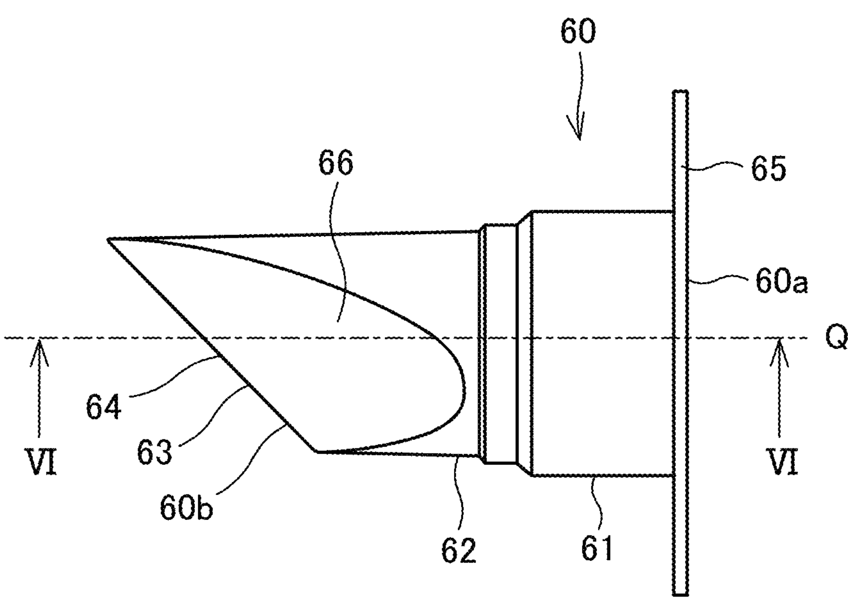
FIG. 3 is a front view of a drainage section in the drainage structure.
Figure 4:
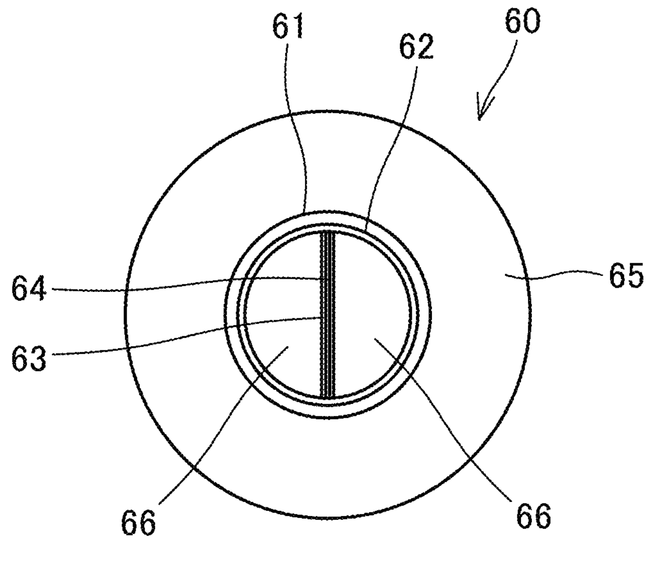
FIG. 4 is a left side view of FIG. 3.
Figure 5:
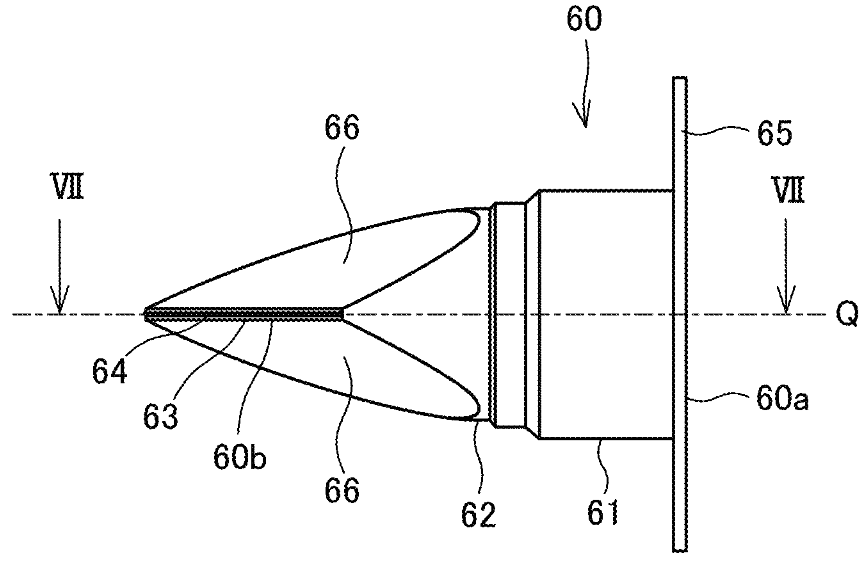
FIG. 5 is a bottom view of FIG. 3.
Figure 6:
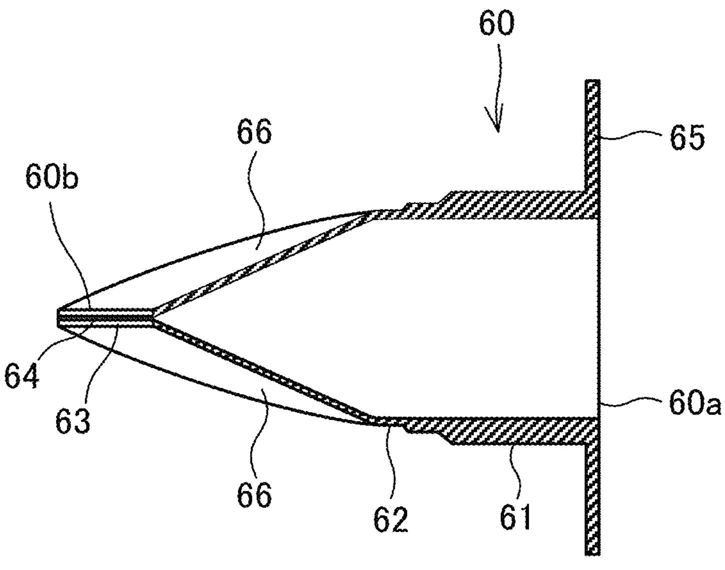
FIG. 6 is a sectional view taken along line VI-VI in FIG. 3.
Figure 7:
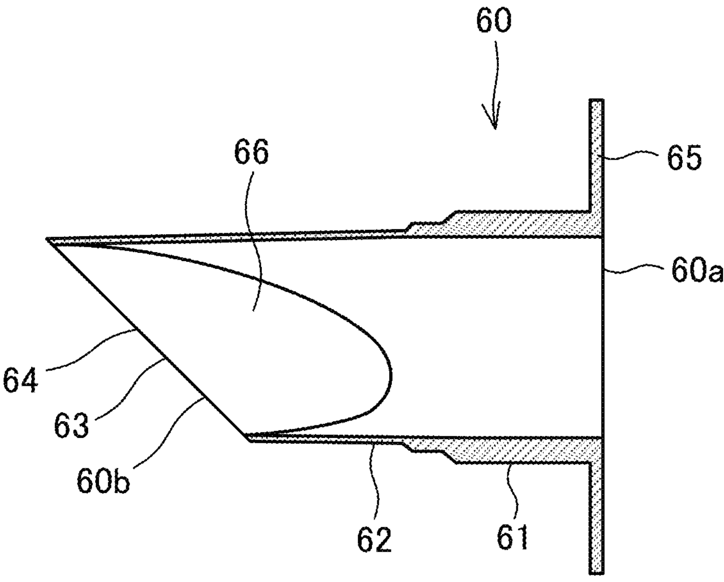
FIG. 7 is a sectional view taken along line VII-VII in FIG. 5.

Next, the drainage plug 60 in the drainage structure 100 will be described specifically with reference to FIGS. 3 to 7. FIG. 3 is a front view of the drainage plug 60 in the drainage structure 100. FIG. 4 is a left side view of FIG. 3. FIG. 5 is a bottom view of FIG. 3. FIG. 6 is a sectional view taken along line VI-VI in FIG. 3. FIG. 7 is a sectional view taken along line VII-VII in FIG. 5.

As shown in FIG. 3, the drainage plug 60 has a straight pipe portion 61, a drainage section 62, an inclined portion 63, the slit 64, a flange portion 65, and inclined faces 66. A base end portion 60*a* of the drainage plug 60 is attached to the straight pipe portion 61. A tip end portion 60*b* of the drainage plug 60 forms the tip end portion 50*b* of the drain pipe 50 (see FIG. 2). The drainage plug 60 is formed of an elastomer such as rubber or resin having elasticity.

The straight pipe portion 61 is provided on the base end portion 60*a* of the drainage plug 60. The straight pipe portion 61 has a circular cross-sectional shape. The straight pipe portion 61 is fitted to an outer perimeter of the guide portion 51.

The drainage section 62 is formed continuously from the straight pipe portion 61 towards the tip end portion 60*b* side of the drainage plug 60. The drainage section 62 protrudes towards the front side of the vehicle 1 from the guide portion 51 (see FIG. 2). As shown in FIGS. 6 and 7, the drainage section 62 is formed to have a smaller wall thickness than the straight pipe portion 61. For example, the drainage section 62 is formed to have the wall thickness of 0.5 [mm]. Thus, the drainage section 62 is more susceptible to deformation than the straight pipe portion 61 when water pressure is applied from the outside. The drainage section 62 is provided with the inclined portion 63, the slit 64, and the inclined faces 66.

The inclined portion 63 is provided on a tip end of the drainage section 62. The inclined portion 63 is inclined linearly upwards gradually along the extending direction from the lower end portion.

As shown in FIG. 4, the slit 64 is formed along the up-down direction at the center of the drainage section 62 in the left-right direction. The slit 64 is provided in the inclined portion 63. As shown in FIG. 3, the slit 64 is formed so as to be inclined upwards gradually along the extending direction from the lower end portion. The slit 64 does not have an opening width and is not open under a normal state. When a predetermined amount of the condensed water is accumulated inside the drainage plug 60, the slit 64 is opened as the drainage section 62 is deformed by the pressure applied by the condensed water.

As described above, the drainage structure 100 has the drain pipe 50 for draining the condensed water to the outside by extending in the attachment direction of the cover 30 (the front-rear direction) by being inserted into the cover 30. Therefore, for example, compared with a case in which a drain pipe extends vertically in the up-down direction, it is more difficult for the condensed water to be drained.

In contrast, the drain pipe 50 includes the slit 64 that extends diagonally upward from the lower end portion along the extending direction. Thus, the pressure applied by the water accumulated in the drain pipe 50 acts on a lower region of the slit 64, and when a predetermined amount of the condensed water is accumulated, the slit 64 is opened by the pressure applied by the condensed water. Therefore, even in a case in which the drain pipe 50 extends in the attachment direction of the cover 30 (the front-rear direction), it is possible to ensure the drainage of the condensed water.

The flange portion 65 is provided on the base end portion 60*a* of the drainage plug 60. The flange portion 65 is formed so as to extend further radially outward from the entire circumference of the outer perimeter of the straight pipe portion 61, thereby increasing its diameter. The flange portion 65 is clamed between the case 7 of the HVAC unit 6 and the cover 30 (see FIG. 2). With such a configuration, a gap between the outer perimeter of the straight pipe portion 61 of the drainage plug 60 and an inner perimeter of the insertion hole 33 of the cover main body 31 is sealed. Thus, it is possible to completely isolate the engine compartment 2 from the vehicle cabin 3.

As shown in FIGS. 4 and 5, the inclined faces 66 are respectively provided on the left side and the right side of the slit 64. The inclined faces 66 are a pair of flat planes that are each inclined towards the slit 64 from a portion of the drainage section 62 with the circular cross-sectional shape. By providing the inclined faces 66, when the drainage plug 60 enters water, water pressure acts on the inclined faces 66, and thereby, a force acts on the slit 64 in the direction in which the slit 64 is closed. Thus, even in a case in which the drainage plug 60 is in water, it is possible to prevent water from entering the drainage plug 60 from the slit 64.

According to the embodiment mentioned above, the advantages described below are afforded.

The drainage structure 100 for the air-conditioning device 5 of the vehicle 1 includes: the partition wall 4 configured to partition between the interior and the exterior of the vehicle cabin 3 for the passenger; the evaporator 11 arranged at the outside of the partition wall 4 for the vehicle cabin 3, the evaporator 11 being configured to cool the air to be supplied to the interior of the vehicle cabin 3 through the heat exchange with the refrigerant; and the cover 30 attached to the partition wall 4 from the front side of the vehicle cabin 3, the cover 30 being configured to accommodate the evaporator 11. The drainage structure 100 further includes the drain pipe 50 for draining the condensed water generated by the evaporator 11 to the outside by extending in the attachment direction of the cover 30 by being inserted into the cover 30, and the drain pipe 50 has the slit 64 formed so as to be inclined upwards along the extending direction from the lower end portion.

With such a configuration, the drain pipe 50 for draining the condensed water to the outside by extending in the attachment direction of the cover 30 by being inserted into the cover 30 is provided. Therefore, although the drain pipe 50 needs to be inserted into the cover 30 when the cover 30 is to be attached to the partition wall 4, it suffices that the cover 30 is formed with the insertion hole 33 having the size that allows the insertion of the drain pipe 50. Therefore, even in a case in which the evaporator 11 is provided at the outside of the partition wall 4 for the vehicle cabin 3 and in which the insertion hole 33 for draining the condensed water to the outside is provided in the cover 30, it is possible to suppress the entry of the outside noise to the vehicle cabin 3.

In addition, the drain pipe 50 is formed with the slit 64 that extends diagonally upward from the lower end portion along the extending direction. Thus, the pressure applied by the water accumulated in the drain pipe 50 acts on the lower region of the slit 64, and when a predetermined amount of the condensed water is accumulated, the slit 64 is opened by the pressure applied by the condensed water. Therefore, even in a case in which the drain pipe 50 extends in the attachment direction of the cover 30 (the front-rear direction), it is possible to ensure the drainage of the condensed water.

Although the embodiment of the present invention has been described in the above, the above-mentioned embodiment merely illustrates a part of application examples of the present invention, and the technical scope of the present invention is not intended to be limited to the specific configurations of the above-described embodiment.

The present application claims a priority based on Japanese Patent Application No. 2021-190302 filed with the Japan Patent Office on Nov. 24, 2021, the entire content of which are incorporated into this specification by reference.

The invention claimed is:

1. A drainage structure for a vehicle air-conditioning device of a vehicle, the vehicle comprising: a partition wall configured to partition between an interior and an exterior of a vehicle cabin for a passenger; an evaporator arranged at outside of the partition wall for the vehicle cabin, the evaporator being configured to cool air to be supplied to the interior of the vehicle cabin through heat exchange with a refrigerant; and a cover attached to the partition wall from a front side of the vehicle cabin, the cover being configured to accommodate the evaporator, the drainage structure comprises a drain pipe for draining condensed water generated by the evaporator to outside by extending in an attachment direction of the cover by being inserted into the cover, wherein the drain pipe has:

a pair of inclined surfaces extending from a first portion of the drain pipe in an extending direction;

an inclined portion provided at distal ends of the pair of inclined surfaces and inclined upwards along the extending direction from a lower end portion; and a slit formed in the inclined portion.

2. The drainage structure for the vehicle air-conditioning device according to claim 1, wherein the slit is not open under a normal state, and the slit being opened by a pressure of the condensed water when a predetermined amount of the condensed water is accumulated.

3. The drainage structure for the vehicle air-conditioning device according to claim 1, wherein the drain pipe has:

a guide portion configured to guide the condensed water generated by the evaporator to the extending direction; and a drainage plug attached to a tip end of the guide portion, and the slit being provided on the drainage plug.

4. The drainage structure for the vehicle air-conditioning device according to claim 3, wherein the drainage plug has a flange portion configured to seal a gap between the drainage plug and the opening.

5. The drainage structure for the vehicle air-conditioning device according to claim 1, wherein the drain pipe is provided so as to be inclined by a first predetermined angle with respect to a horizontal plane so that a tip end portion, at which the slit is provided, is positioned lower than a base end portion, to which the condensed water generated by the evaporator is supplied, and the slit is provided so as to be inclined by a second predetermined angle with respect to the horizontal plane, the second predetermined angle being greater than the first predetermined angle.

6. The drainage structure for the vehicle air-conditioning device according to claim 1, wherein the pair of inclined surfaces is a pair of flat planes.

7. A drainage structure for a vehicle air-conditioning device of a vehicle, the vehicle comprising: a partition wall configured to partition between an interior and an exterior of a vehicle cabin for a passenger; an evaporator arranged at outside of the partition wall for the vehicle cabin, the evaporator being configured to cool air to be supplied to the interior of the vehicle cabin through heat exchange with a refrigerant; and a cover attached to the partition wall from a front side of the vehicle cabin, the cover being configured to accommodate the evaporator, the drainage structure comprises a drain pipe for draining condensed water generated by the evaporator to outside by extending in an attachment direction of the cover by being inserted into the cover, wherein the drain pipe has:

a slit formed so as to be inclined upwards along an extending direction from a lower end portion, a guide portion configured to guide the condensed water generated by the evaporator to the extending direction; and a drainage plug attached to a tip end of the guide portion, and the slit being provided on the drainage plug.

8. The drainage structure for the vehicle air-conditioning device according to claim 7, wherein the drainage plug has a flange portion configured to seal a gap between the drainage plug and the opening.

9. A drainage structure for a vehicle air-conditioning device of a vehicle, the vehicle comprising: a partition wall configured to partition between an interior and an exterior of a vehicle cabin for a passenger; an evaporator arranged at outside of the partition wall for the vehicle cabin, the evaporator being configured to cool air to be supplied to the interior of the vehicle cabin through heat exchange with a refrigerant; and a cover attached to the partition wall from a front side of the vehicle cabin, the cover being configured to accommodate the evaporator, the drainage structure comprises a drain pipe for draining condensed water generated by the evaporator to outside by extending in an attachment direction of the cover by being inserted into the cover, wherein the drain pipe has a slit formed so as to be inclined upwards along an extending direction from a lower end portion, the drain pipe is provided so as to be inclined by a first predetermined angle with respect to a horizontal plane so that a tip end portion, at which the slit is provided, is positioned lower than a base end portion, to which the condensed water generated by the evaporator is supplied, and the slit is provided so as to be inclined by a second predetermined angle with respect to the horizontal plane, the second predetermined angle being greater than the first predetermined angle.

* * * * *